United States Patent [19]
Shaklee

[11] Patent Number: 5,184,154
[45] Date of Patent: Feb. 2, 1993

[54] METHOD AND APPARATUS FOR IMAGE PRODUCTION BY SELECTIVE OR RANDOM EXPOSURE ELEMENT ACTIVATION

[75] Inventor: Kerry L. Shaklee, Brighton, Colo.

[73] Assignee: Alliant Techsystems Inc., Edina, Minn.

[21] Appl. No.: 588,231

[22] Filed: Sep. 26, 1990

[51] Int. Cl.⁵ .................. G01D 15/14; H04N 3/16; H04N 1/23

[52] U.S. Cl. .................. 346/110 R; 358/220; 358/302

[58] Field of Search .................. 346/110 R, 1.1; 315/379, 391, 371; 358/302, 220, 217, 348

[56] References Cited

U.S. PATENT DOCUMENTS

| | | | |
|---|---|---|---|
| 3,700,955 | 10/1972 | Lowe | 346/110 R X |
| 4,095,235 | 6/1978 | Quarton et al. | 346/110 R |
| 4,172,259 | 10/1979 | Lowe | 346/110 R |
| 4,309,720 | 1/1982 | Denham | 358/75 |
| 4,412,230 | 10/1983 | Goldberg | 346/110 R |
| 4,499,501 | 2/1985 | Eriksen et al. | 358/302 |
| 4,670,778 | 6/1987 | Miyakawa | 358/302 X |
| 4,769,715 | 9/1988 | Feldman et al. | 358/244 |
| 4,792,733 | 12/1988 | Redfern | 358/220 |
| 4,912,566 | 3/1990 | Tasaka | 358/451 |
| 4,952,923 | 8/1990 | Tamura | 340/731 |

Primary Examiner—Benjamin R. Fuller
Assistant Examiner—David Yockey
Attorney, Agent, or Firm—Merchant, Gould, Smith, Edell, Welter & Schmidt

[57] ABSTRACT

A method and apparatus for improving the image quality of a CRT recorder wherein image information is transmitted to the image receiving medium through a plurality of tracks provided on a phosphor stripe of the CRT. An algorithm in the memory determines the deflection of the electron beam so that the tracks are activated in a predetermined order. As the image receiving medium is scrolled past the CRT faceplate, the image will be exposed on the image receiving medium so that no two adjacent image lines are exposed by adjacent tracks. In a further embodiment, image lines are produced by activating the tracks in a random order.

17 Claims, 4 Drawing Sheets

| TRACK NUMBER | IMAGE RECEIVING MEDIUM LINE NUMBER |
|---|---|
| 0 | 39 |
| 12 | 28 |
| 24 | 17 |
| 36 | 6 |
| 9 | 34 |
| 21 | 23 |
| 33 | 12 |
| 6 | 40 |
| 18 | 29 |
| 30 | 18 |
| 3 | 46 |
| 15 | 35 |
| 27 | 24 |
| 0 | 52 |
| ↓ | ↓ |

| LINE SEQUENCE TABLE | | 16c |
|---|---|---|
| 0 | ← R1 | |
| 3 | ← R2 | |
| 1 | ← R3 | |
| 4 | ← R4 | |
| 2 | ← R5 | |
| 0 | ← R6 | |
| 3 | ← R7 | |

FIG. 7A

| LINE POINTER TABLE | | 16b |
|---|---|---|
| 0 | ← W1 | |
| 1 | | |
| 2 | | |
| 3 | | |
| 4 | | |

FIG. 7B

| LINE POINTER TABLE | | 16b |
|---|---|---|
| 5 | ← R | |
| 1 | | |
| 2 | ← W2 | |
| 3 | | |
| 4 | | |

FIG. 7C

| LINE POINTER TABLE | | 16b |
|---|---|---|
| 5 | | |
| 6 | ← R | |
| 2 | | |
| 3 | | |
| 4 | ← W3 | |

FIG. 7D

| LINE POINTER TABLE | | 16b |
|---|---|---|
| 5 | | |
| 6 | ← W4 | |
| 7 | ← R | |
| 3 | | |
| 4 | | |

FIG. 7E

| LINE POINTER TABLE | | 16b |
|---|---|---|
| 5 | | |
| 6 | | |
| 7 | | |
| 3,8 | ← W5,R | |
| 4 | | |

FIG. 7F

| LINE POINTER TABLE | | 16b |
|---|---|---|
| 5 | ← W6 | |
| 6 | | |
| 7 | | |
| 8 | | |
| 9 | ← R | |

FIG. 7G

| LINE POINTER TABLE | | 16b |
|---|---|---|
| 10 | ← R | |
| 6 | | |
| 7 | ← W7 | |
| 8 | | |
| 9 | | |

FIG. 7H

METHOD AND APPARATUS FOR IMAGE PRODUCTION BY SELECTIVE OR RANDOM EXPOSURE ELEMENT ACTIVATION

BACKGROUND

1. Field of the Invention

This invention relates to an image transfer method and apparatus, and more specifically to improving the quality of an image transferred to an image receiving medium.

2. Description of the Prior Art

The use of a fiber optic cathode ray tube (CRT) in a hard copy recording system is well known. The CRT provides a luminous signal which is received by a light sensitive medium and a permanent visual representation of the signal is formed. The signal represents image information stored on a line by line basis. The luminous signal is created when a beam of electrons strikes a phosphorescent stripe on the inner side of the CRT face plate. As the electron beam scans the phosphor stripe from one end of the faceplate to the other, the phosphor coating will emit light which will in turn impinge on the image receiving medium as it moves past the CRT face plate. The scrolling of a image receiving medium is synchronized with the transfer of the image information from the CPU, and its movement is substantially perpendicular to the scanning plane of the electron beam.

In most of the prior art, only one phosphor stripe is used on the faceplate of the CRT. The electron beam repeatedly traces a single track along the phosphor stripe which exposes the image receiving medium. This technique can lead to image quality problems. One problem comes about because of variations in the thickness of the phosphor stripes. During manufacture of the CRT, the thickness of the phosphor applied to the CRT screen may vary causing the light emitted during the operation to be of greater intensity in the places where the phosphor is the thickest. This may lead to undesirable artifacts appearing in the exposed image. These artifacts will appear on every line of the exposed image if the one track technique of the prior art is used. Another problem with the single track CRT recorders is that as the track is continuously activated, the phosphor along the track will in time lose its efficiency and a line will be permanently burned into the phosphor.

One solution was disclosed in U.S. Pat. No. 4,499,501 issued on Feb. 12, 1985 to Joern B. Eriksen which uses multiple tracks. As there described, each line on the image receiving medium is exposed by each track on the phosphor stripe in the CRT. As the image receiving medium is scrolled past the faceplate, each line on the image receiving medium will be exposed the same number of times that there are tracks, and each exposure is only a fraction of the full exposure needed. This prior art proposes a solution to the problem of repeatedly exposing any deficiency in a transmission path, but since every transmission path is continuously activated the problem with phosphor ageing still exists.

SUMMARY OF THE INVENTION

It is an object of this invention to improve image quality by reducing artifacts in an exposed image caused by non-uniformities in the exposure elements (tracks on a phosphor stripe in a CRT hard copy recorder.).

It is another object of this invention to reduce phosphor ageing in a CRT hard copy recorder.

These objects are accomplished by establishing a method for activating a plurality of adjacent and parallel tracks on a phosphor stripe during the image transfer process. These tracks will be activated in a particular sequence while the image receiving medium is stepped past the faceplate of the CRT. The image is exposed so that no two adjacent image lines on the image receiving medium are exposed by the same track. An algorithm can be used in some situations to describe the sequence of activations of the tracks, while in others a random number series may suffice.

Before the exposure process begins, a table is calculated which contains the order of activation of the tracks. This table is put into memory as well as the image information which is to be exposed. As the process begins, the first track and the corresponding line of image information are retrieved from memory. A CRT with the capacity to deflect and scan any of the parallel tracks activates the first track in the table and exposes a line on the image receiving medium. The image receiving medium is stepped one line and the next track to be activated is retrieved from the table. This process continues until the whole image is exposed.

By using the above described method of track activation, any non-uniformity in the exposed image caused by a deficiency in one track will not be repeated on every line of the image. Between each exposure, the electron beam will deflect perpendicularly to the movement of the image receiving medium, and a set number of tracks will be skipped over. A central processing unit (CPU) takes into account the movement of the image receiving medium so that all image lines will be equally exposed. The problem of phosphor ageing may be for the most part eliminated by the use of multiple tracks. Because no one track will be continuously activated, and there is a significant time interval between activations, the phosphor stripes will not be burned, and their efficiency will not be reduced.

BRIEF DESCRIPTION OF DRAWINGS

A better understanding of the present invention may be had from the following detailed description when read in connection with the accompanying drawings.

FIG. 7A-7H, referred to collectively herein as FIG. 7, illustrates an example of how information is entered into and read from memory.

DETAILED DESCRIPTION OF THE PREFERRED EMBODIMENT

Figure 2:
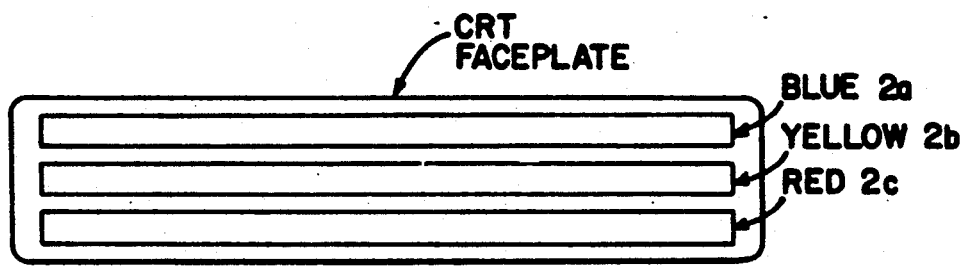
FIG. 2 is a front view of the faceplate of a fiber optic CRT suitable for use in the applicant's invention.
Figure 3:
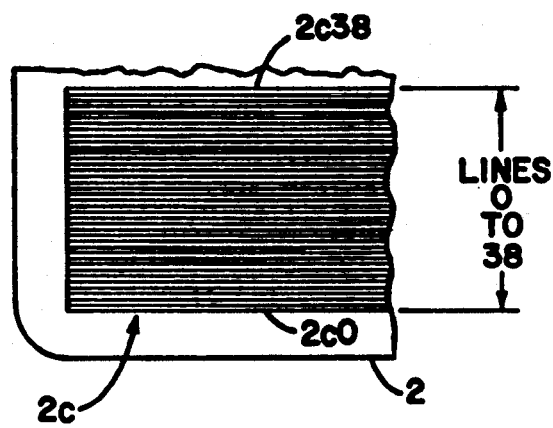
FIG. 3 is an enlarged view of a portion of a phosphor stripe on the faceplate of FIG. 2.
Figure 1:
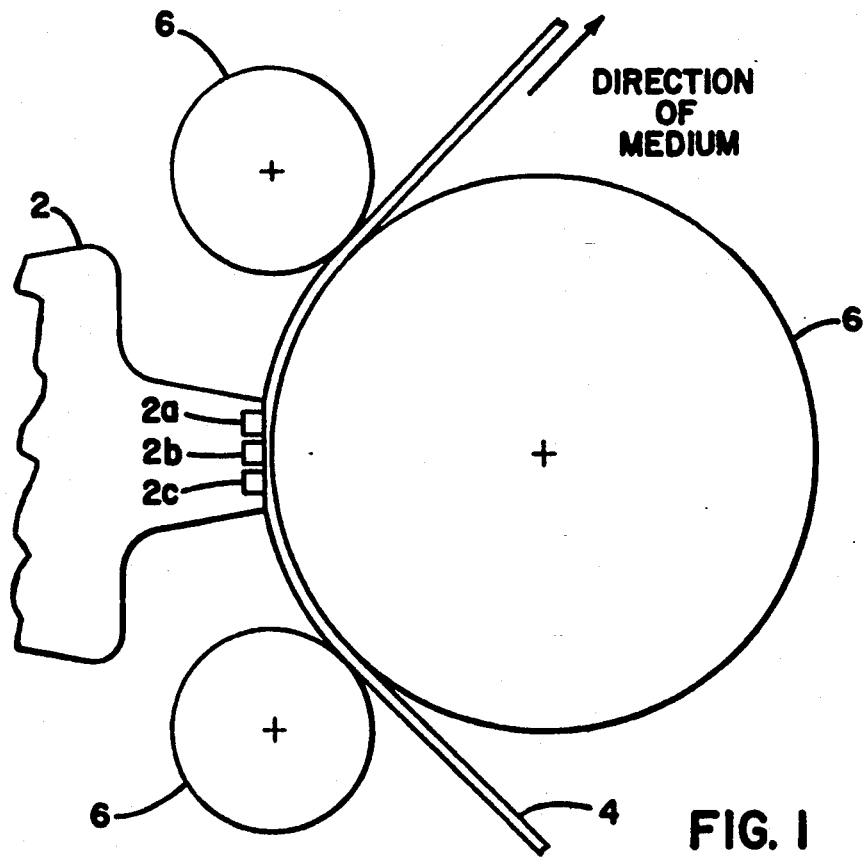
FIG. 1 is an internal view of a portion of recording apparatus used in the applicants invention, including a fiber optic CRT, a web or sheet of image receiving medium and rollers for moving the medium past the CRT.

The apparatus used to expose the image is shown in FIGS. 1-3. The CRT 2, which has three phosphor display areas or stripes on its faceplate, is butted up against the image receiving medium 4. The rollers 6 move the image receiving medium 4 past the CRT 2. The image receiving medium being a photo sensitive recording sheet. Each of the color phosphor display areas 2A, 2B, and 2C are divided up into 39 phosphor stripes, and each stripe can be individually activated by the scanning electron beam to expose a single image line on the image receiving medium 4.

As was stated, during the manufacture of a CRT, the thickness of the phosphorescent coating on the faceplate can vary to the extent that non-uniformities may appear in the final exposed image. If the CRT uses only a single track on a phosphor stripe, the non-uniformity will continuously appear in the exposed image. Also, if only one track is used in this system, the phosphor stripe could soon lose its efficiency through overuse and have a line permanently burned into it. The present invention represents an improvement over the prior art. Instead of just using one track to expose the image, multiple tracks are used. After the exposure of one image line, a different track is used to expose the next, and the procedure continues so that no two adjacent image lines on the image receiving medium are exposed by the same track. Because a different track is used after each exposure and there is a significant amount of time between activations of any one track, the possibility of phosphor burn is significantly reduced.

For this multiple track technique to work properly, enough tracks should be skipped over between activations to avoid any non-uniformities that may extend over multiple tracks. However, all lines on the image receiving medium must be equally exposed, and a pattern must be established so that every line of the image is exposed. In this system, the order the tracks are to be activated is calculated before the exposure process begins and is stored in an accessible table. As the process begins, the first track in the table is activated and a line of the image is exposed on the image receiving medium.

Figures 4, 5:
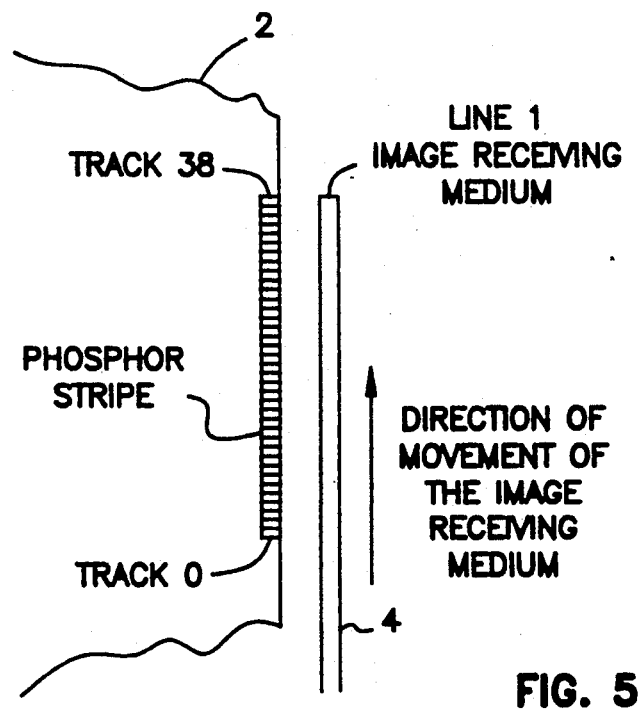
FIG. 4 is a table showing one example of a sequence of tracks on a phosphor band used to expose an image in accordance with the applicant's invention.
FIG. 5 is an enlarged partial view of a portion of a CRT and image receiving medium for carrying out the sequence of FIG. 4.

Prior to the next exposure in one satisfactory example, the image receiving medium is stepped one line and the next track to be activated is read out of the table. Because the movement of the image receiving medium is taken into account, no image line is exposed more than once and no two adjacent lines on the image receiving are exposed by adjacent phosphor stripes. This process is shown in FIGS. 4 and 5.

The image receiving medium is aligned with the CRT, so that line 2c0 of the phosphor stripes coincides with the 39th line of the image receiving medium 4. In the table of FIG. 4, the order of activation for the tracks is shown in the left column while the line of the image that is exposed by this track is shown in right column. In this particular case, the left column was calculated by using the equation $Y = X(Z) \bmod N$ where N is the number of elements in the array exposure elements (tracks), x is the number of exposure elements skipped over between each activation of a track, Y is the number of the track which is currently being activated, Z is the number of times the tracks have been activated during the current exposure process, and X and N share a common divisor. In the example, N=39, X=12, and the image receiving medium is stepped one image line in the opposite direction from which the tracks numerically increase after each activation. If the 2c38 track is reached during the count, the count resumes at the 2c0 stripe.

In an alternative embodiment, the exposure elements are activated according to the sequence $Y = N - N - (X(Z) \bmod N)$ when $N = (X(X-1)+1$ where N is the number of exposure elements, X is the number of exposure elements skipped over between activations, Y is the number of the exposure elements currently being activated, and Z is the number of times the exposure elements have been activated during the current exposure process. The image receiving medium is stepped one image line in the same direction in which the exposure elements numerically increase.

To start the process, the electron beam scans track 2c0 and the 39th line of the image is exposed. Following this, the image receiving medium is stepped one line so that the 40th line of the image receiving medium 4 coincides with track 2c0. The electron beam then deflects up and activates the track 2c12. This will expose the 28th line of the image. After the tracks 2c24 and 2c36 are are activated, exposing lines 17 and 6 of the image receiving respectively, the electron beam will deflect back down to the 2c9 track and expose the 34th line of the image on the image receiving medium. This pattern of activating tracks in the table and stepping the image receiving medium past the CRT will continue until the whole image is exposed. Depending on the sequence of activations, some lines near the edge of the image receiving medium where the exposure process begins may be left blank. This can be seen in the example in FIG. 2 between lines 0 and 28 on the image receiving medium. This will not affect the operation of the recorder because the lines left blank will be made to appear in the border of the image, and the lines that are exposed in this area will be intentionally left blank.

Figure 6:
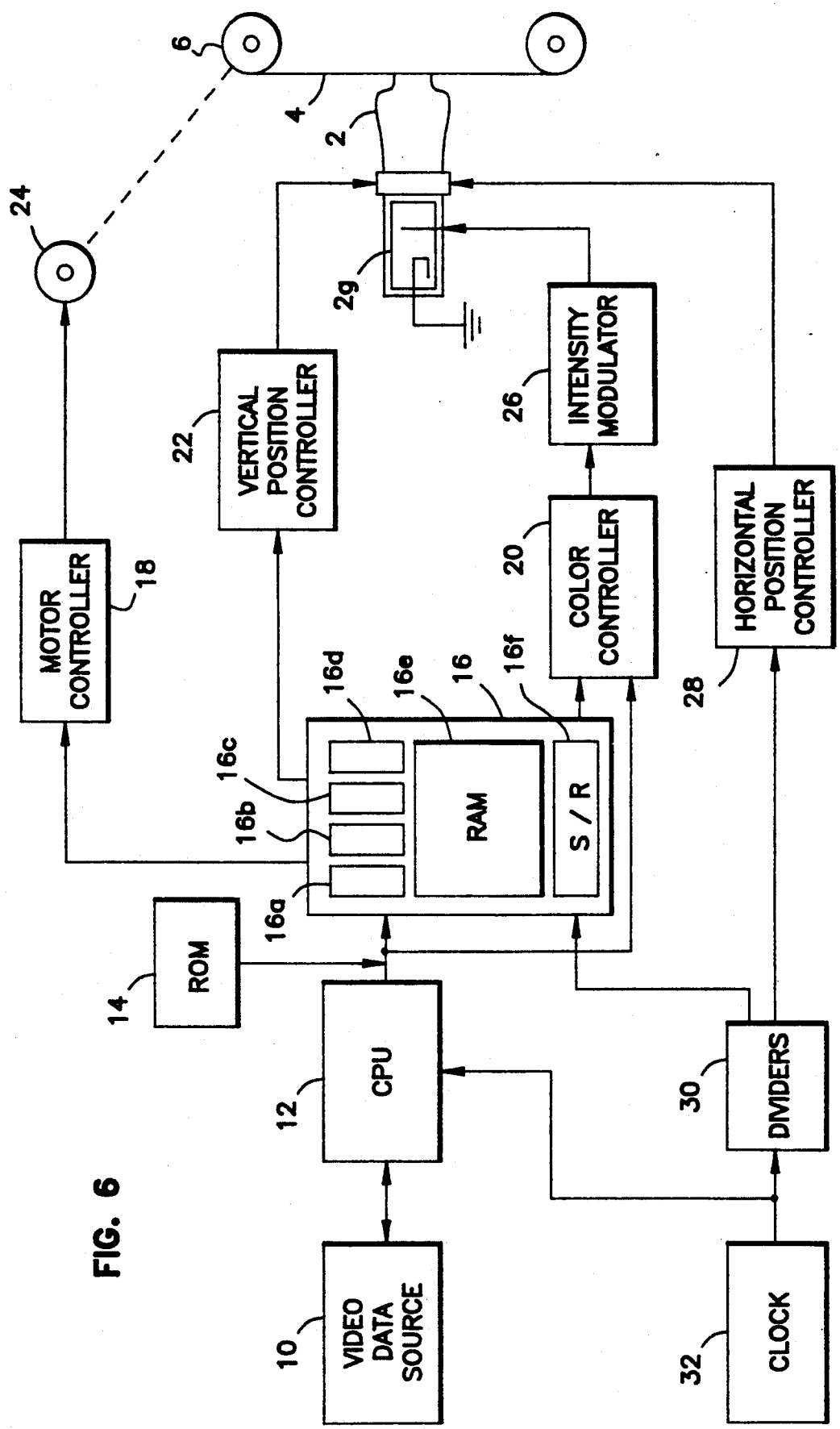
FIG. 6 is a block diagram of the CRT recorder system of the applicant's invention.

The system used to implement this invention for a CRT recorder is shown in FIG. 6 of the drawings. The central processing unit (CPU) 12 receives image information from the video data source 10 in analog form, and digitizes it. This image information is then sent to the random access memory (RAM) 16 where it is stored on a line by line basis in the memory buffer 16e. Each line of image information in the memory buffer 16e is given a particular address and these addresses are stored in the line pointer table 16b. The read only memory (ROM) 14 stores the algorithm which determines the order of activation of the phosphor stripes. An order of activation is calculated for the tracks, and this data is stored in the line sequence table 16c. The program variable table 16a contains information necessary for the running of the system. The motor stepping table 16d responds to the changes in the line pointer table 16b and the line sequence table 16c, and it sends a signal to the motor controller 18 which controls the stepper motor 24 as it steps the image receiving medium past the CRT in synchronism with the transfer of image information. The shift register 16f receives image information from the memory buffer 16e and stores it until the CRT is ready to expose it. The line sequence table sends a signal to the vertical position controller 22 which will control the vertical deflection of the electron beam so that the correct phosphor stripe is activated. The clock 32 controls the rate at which image pixels are transferred from the shift register to the color controller 20, and the rate at which the electron gun 2g scans horizontally across the phosphor stripes. The dividers 30, split the clock 32 signal between the RAM 16 and the horizontal position controller 28. The intensity modulator 26 converts the digital signal it receives from the color controller 20 to analog so that the CRT can expose the image receiving medium.

FIG. 7 is an example of the employment of the line sequence table 16c and the line pointer table 16b. For demonstration purposes, the phosphor stripe only has five tracks. Before the exposure process begins, the sequence in which the tracks are to be activated is transferred from the ROM 14, where it is created, to the line sequence table. Digitized image information is transferred from the CPU and is stored in the memory buffer 10 on a line by line basis. At a minimum, the memory buffer should be at least large enough to hold any image line which the three display areas 2a-c are in a position to expose on the image receiving medium. In FIG. 7, a line pointer table and a line sequence table for a CRT that has five tracks are shown. As the exposure process begins, the electron beam is deflected so that it is in a position to activate the first track shown in the line sequence table. After the number of the track which is to be activated is read, this number is used to find the correct image line address in the line pointer table. In the example, after the first entry in the line sequence table is read the first entry in the line pointer table is read and this address is used to find the line of image information in the memory buffer. The second value is then read out of the line sequence table. Because three tracks are skipped between each activation, the write function of the line pointer table will skip down three addresses from its previous position, but then count back up one because the image receiving medium stepped one image line. This will be the address of the next line of image information to be exposed. After each activation of a track, the write function of the line pointer table will count down two more positions and retrieve the address. When the last address in the table is encountered the count is continued back at the beginning of the table.

Because there is limited memory space, new addresses must be constantly input into the line pointer table 16b. When a line on the image receiving medium has moved past the faceplate of the CRT and is no longer in a position to be exposed, there is no longer a reason to keep this information in memory. In this system, when the image information becomes no longer exposable it is replaced by image information which the CRT is in a position to expose. In FIG. 7, it can be seen that after the zero address is read and the corresponding image line is exposed, the image receiving medium will be stepped one line and the zero line of the image receiving medium will move past the face of CRT and will no longer be exposable. Because the fifth line of the image receiving medium is now exposable, the first position in the line pointer table is replaced by the address for line 5 of the image receiving medium. After the image receiving medium is stepped again the sixth line of the image receiving medium moves into a position to be exposed. Its address will replace the address for the image information of line 1 of the image receiving medium in the line pointer table 16b. As seen in the example in FIG. 7, this replacement of information is a continuing procedure. If the read and write functions are at the same position in the line pointer table 16b, the address currently in the table will be written before the new image information address will be inputted.

In summary, this method of exposing image lines on an image receiving medium with a CRT recording system is an improvement over the prior art. Any phosphor stripe which may have a deficiency in it will not be continually used to expose the image, and the use of multiple phosphor stripes instead of just a single stripe will increase the overall efficiency of the phosphor stripes.

I claim:

1. A method of producing on an image receiving medium an image formed of a sequence of adjacent image lines from stored image data representative of individual image lines by means for producing the image including an array of exposure elements, each of the exposure elements when the activated accepting the stored image data representative of an individual image line and producing a corresponding adjacent image line on an are of the image receiving medium in a predetermined position relative to the exposure elements being activated, comprising the steps of:

selectively activating the exposure elements;

moving the image receiving medium relative to the array of exposure elements in a direction transverse to the adjacent image lines between successive activations of the exposure elements; and supplying the stored image data to the exposure elements being activated in coordination with the predetermined position of the image receiving medium relative to the array of exposure elements so that no adjacent image lines on the medium are produced by adjacent exposure elements of the array of exposure elements.

2. The method of claim 1 wherein:

the exposure elements of the array of exposure elements are selectively activated according to $Y = X(Z) \mod N$, where N is a predetermined number of the exposure elements in the array of exposure elements, Y is equal to one of 1 to N of an exposure element being activated, X is equal to a number of the exposure elements between successively activated exposure elements and Z is a number of times the exposure elements have been activated during a current exposure process, and X and N share a whole number divisor; and the image receiving medium is stepped one image line in an opposite direction from which the exposure elements numerically increase.

3. The method of claim 2 wherein:

the predetermined number of the exposure elements (N) in the array of exposure elements is 39; and the number of the exposure elements between successively actuated exposure elements (X) is 12.

4. The method of claim 2 wherein:

the step of selectively activating the exposure elements is performed over a plurality of display areas each producing a separate color component.

5. The method of claim 1 wherein:

the step of selectively activating the exposure elements of the array of exposure elements is described by $Y = N - 1 - (X(Z) \mod N)$ when $N = (X(X-1)) + 1$, where N is a predetermined number of the exposure elements, X is a number of the exposure elements skipped over between activations, Y is equal to one of 1 to N of an exposure element currently being activated, and Z is a number of times the exposure elements have been activated during a current exposure process; and the image receiving medium is stepped one image line in a same direction in which the exposure elements numerically increase.

6. The method of claim 5 wherein:

the step of selectively activating the exposure elements is performed over a plurality of display areas each producing a separate color component.

7. The method of claim 1 wherein:
the step of selectively activating the exposure elements is performed over a plurality of display areas each producing a separate color component.

8. Apparatus for producing on an image receiving medium an image formed of a sequence of adjacent image lines from stored image data representative of individual image lines, comprising:
first means for receiving the stored image data and for producing on the image receiving medium the image representative of the individual image lines, the first means including a plurality of parallel adjacent exposure elements which are individually and selectively activated to produce an adjacent image line on the image receiving medium;
second means for controlling the activation of the exposure elements so that no two adjacent image lines on the image receiving medium are produced by adjacent exposure elements; and
third means responsive to the second means for stepping the image receiving medium past the exposure elements so the image receiving medium moves one adjacent image line between activations of the exposure elements.

9. Apparatus in accordance with claim 8 wherein:
the second means controls the activation of the exposure elements of the first means with an algorithm;
the algorithm of the second means is described by $Y = X(Z) \bmod N$ where N is a number of the exposure elements, X is a number of the exposure elements skipped over between activations, Y is equal to one of 1 to N of an exposure element which is currently being activated, Y is a number of times the exposure elements have been activated during a current exposure process, and X and N share a whole number divisor; and
the third means moves the image receiving medium in an opposite direction from which the exposure elements numerically increase.

10. An apparatus in accordance with claim 8, wherein:
the second means controls the activation of the exposure elements of the first means with an algorithm;
the algorithm of the second means is described by $Y = N - 1 - (X(Z) \bmod N)$ when $N = (X(X-1)) + 1$, where N is a predetermined number of the exposure elements, X is a number of the exposure elements skipped over between activations, Y is equal to one of 1 to N of an exposure element currently being activated, and Z is a number of times the exposure elements have been activated during a current exposure process; and
the third means moves the image receiving medium in a same direction in which the exposure elements numerically increase.

11. Apparatus in accordance with claim 8 wherein:
the first means comprises a cathode ray tube for generating an electron beam to activate an exposure element in accordance to a control signal from the second means;
the third means comprises a stepper motor which scrolls the image receiving medium across a face of the cathode ray tube in synchronism with the exposure elements being activated by the electron beam.

12. Apparatus of claim 11 wherein:
the cathode ray tube further comprises a plurality of display areas, each display area including a particular array of parallel adjacent exposure elements and each display area producing a separate color component of the image.

13. Apparatus of claim 8 wherein:
the first means comprises a cathode ray tube which incorporates a plurality of display areas, each display area including a particular array of the parallel adjacent exposure elements and each display area producing a separate color component of the image.

14. A hard copy recorder comprising:
a cathode ray tube having a faceplate carrying a phosphor band having a length and a width, the length being large relative to the width, an electron beam generator means for producing an electron beam which impinges on the phosphor band, and beam control means for causing the electron beam having a beam intensity to sweep along the length of the phosphor band, the beam control means further including means for modulating the beam intensity in response to an intensity control signal and means for positioning the electron beam across the width of the phosphor band in response to a trace control signal so that the beam is positioned to sweep a trace along any of a plurality of parallel tracks located across the width of the phosphor band;
drive means for moving a photo sensitive recording sheet over the faceplate of said cathode ray tube across the width of the phosphor band in response to a drive control signal;
a memory including means for accepting image data representative of lines of an image formed of a plurality of image lines and means for transmitting the image data representative of the image lines in response to a data transmission signal; and
control means connected to said cathode ray tube, said drive means and said memory for supplying the data transmission signal to said memory to cause said means for transmitting to transmit the image data to said cathode ray tube as the intensity control signal, said control means further being operable to supply the trace control signal to said cathode ray tube and the drive control signal to said drive means in coordination with transmission of the image data to said cathode ray tube so that adjacent image lines of an image formed on the recording sheet are produced by traces along non-adjacent tracks of the plurality of parallel tracks on the phosphor band.

15. A method of producing on an image receiving medium an image formed of a sequence of adjacent image lines from stored image data representative of individual image lines by means for producing the image including an array of exposure elements, each of the exposure elements when activated accepting the stored image data representative of an individual image line and producing a corresponding adjacent image line on an area of the image receiving medium in a predetermined position relative to the exposure elements being activated, comprising the steps of:
activating the exposure elements in a random order;
moving the image receiving medium relative to the array of exposure elements in a direction transverse to the image lines between successive activations of the exposure elements; and supplying the stored image data to the exposure elements being activated in coordination with the predetermined position of the image receiving medium relative to the array of exposure elements.

16. The method of claim 15 wherein:

the step of selectively activating the exposure elements is performed over a plurality of display areas each producing a separate color component.

17. Apparatus for producing on a image receiving medium an image formed of a sequence of adjacent image lines from stored image data representative of individual image lines, comprising:

first means for receiving the stored image data and for producing on the image receiving medium the image representative of the individual image lines, the first means including a plurality of parallel adjacent exposure elements which are individually activated to produce an adjacent image line on the image receiving medium;

second means for controlling the activation of the exposure elements in a random order; and third means responsive to the second means for stepping the image receiving medium past the exposure elements so the image receiving medium moves one image line between activation of the exposure elements.

* * * * *

UNITED STATES PATENT AND TRADEMARK OFFICE
CERTIFICATE OF CORRECTION

PATENT NO. : 5,184,154
DATED : February 2, 1993
INVENTOR(S) : Shaklee

It is certified that error appears in the above-indentified patent and that said Letters Patent is hereby corrected as shown below:

Col. 3, line 57, insert --of-- after the word "array".

Col. 3, line 58, "x" should read --X--.

Col. 4, line 3, "N" should read --1--. (second occurrence)

Col. 6, line 14, "are" should read --area--.

Signed and Sealed this

Twenty-eight Day of February, 1995

Attest:

BRUCE LEHMAN

Attesting Officer      Commissioner of Patents and Trademarks